United States Patent [19]
Whiteside et al.

[11] 3,958,389
[45] May 25, 1976

[54] RIVETED JOINT

[75] Inventors: Roger B. Whiteside, Cinnaminson, N.J.; Harry T. Long, Jr., Jamison, Pa.

[73] Assignee: Standard Pressed Steel Co., Jenkintown, Pa.

[22] Filed: Dec. 4, 1972

[21] Appl. No.: 311,991

Related U.S. Application Data

[63] Continuation of Ser. No. 885,224, Dec. 15, 1969, abandoned, which is a continuation-in-part of Ser. No. 859,533, April 2, 1969, Pat. No. 3,551,015, which is a continuation of Ser. No. 709,654, March 1, 1968, abandoned.

[52] U.S. Cl. ............................. 52/758 D; 29/522; 29/526; 85/37
[51] Int. Cl. ............................................ F16b 19/04
[58] Field of Search ......... 287/189.36 D, 189.36 F; 151/41.73, 37, 35, 38; 29/522, 526, 509; 85/10 E, 37, 9 R, 5, 7, 1 JP, 50 R

[56] References Cited
UNITED STATES PATENTS

| | | | |
|---|---|---|---|
| 251,788 | 1/1882 | Marker | 85/37 R |
| 834,273 | 10/1906 | Denney | 85/37 R UX |
| 2,322,811 | 6/1943 | Ball | 85/9 R |
| 2,991,858 | 7/1961 | Taylor et al. | 287/189.36 D |
| 3,111,045 | 11/1963 | Iwaki et al. | 85/10 E X |
| 3,127,919 | 4/1964 | Swanstrom | 151/41.73 |
| 3,215,026 | 11/1965 | Davis | 151/41.73 X |
| 3,242,962 | 3/1966 | Dupree | 151/41.73 |
| 3,551,015 | 12/1970 | Whiteside et al. | 287/189.36 D |

FOREIGN PATENTS OR APPLICATIONS

| | | | |
|---|---|---|---|
| 167,888 | 6/1956 | Australia | 151/37 |
| 707,103 | 6/1941 | Germany | 85/37 |

*Primary Examiner*—Ramon S. Britts
*Attorney, Agent, or Firm*—Andrew L. Ney; Aaron Nerenberg; Robert P. Seitter

[57] ABSTRACT

A fastener for use in securing a stack of members together comprises a head adapted to be embedded in an outer surface of the stack and a shank adapted to extend through an aperture in the stack so that a tail projects beyond the other outer surface of the stack. As the head is embedded, material in the stack is displaced and develops residual compressive stresses around the hole in the vicinity of the head; as the tail is upset, the shank expands radially to provide an interference fit with the aperture and develops residual tensile stresses around the hole. In the vicinity of the head, these tensile stresses are superimposed upon the previously developed compressive stresses.

5 Claims, 6 Drawing Figures

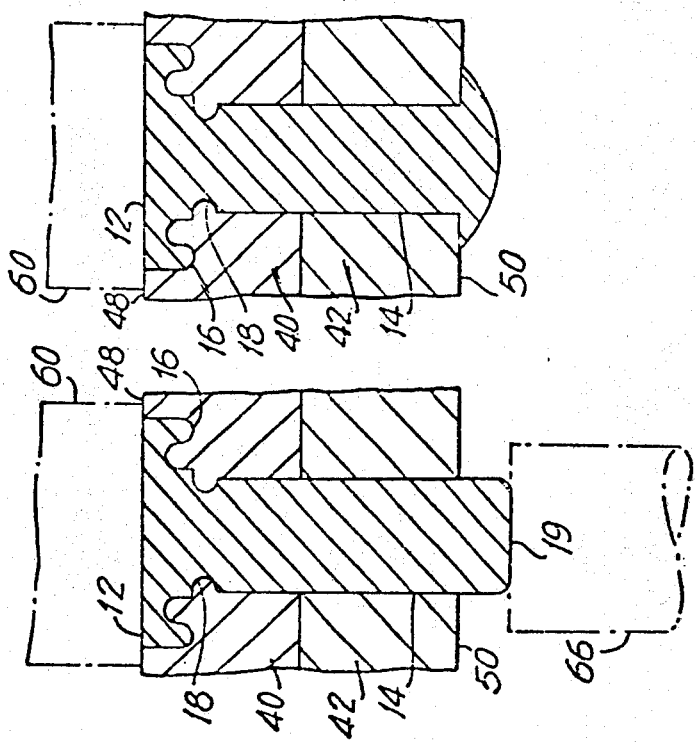
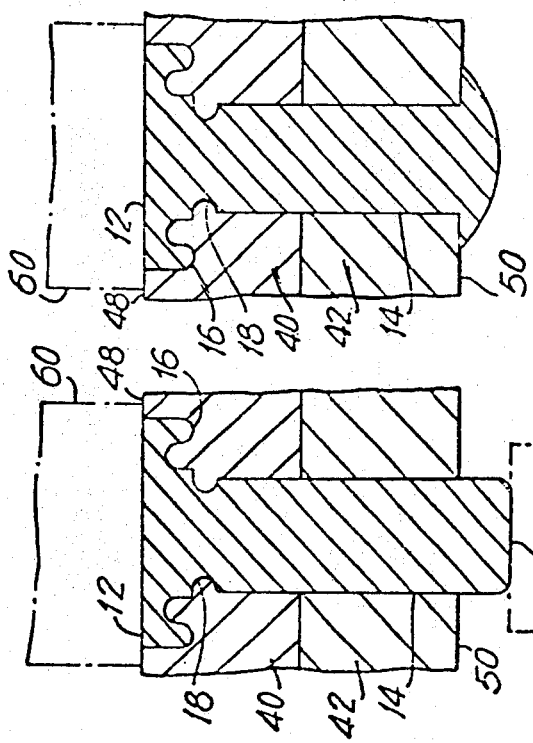
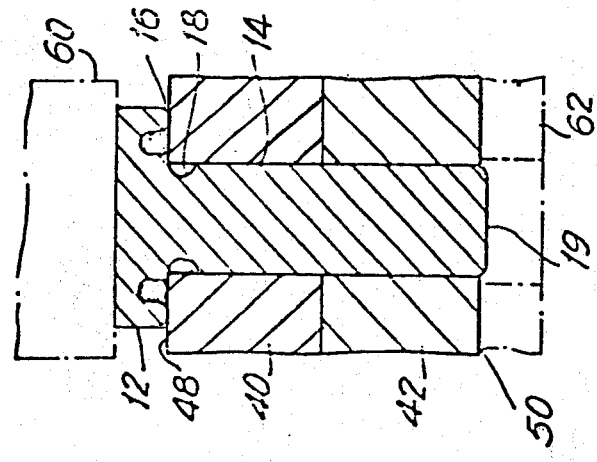
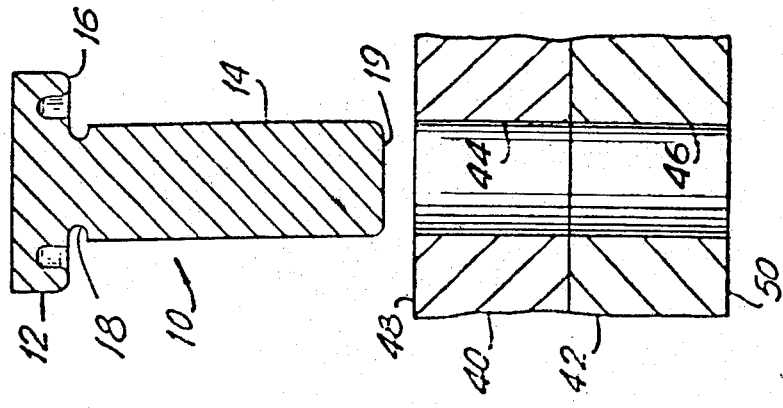

3,958,389

RIVETED JOINT

This is a continuation of application Ser. No. 885,224 filed Dec. 15, 1969, now abandoned, which application was a continuation-in-part of application Ser. No. 859,533 filed Apr. 2, 1969 and now U.S. Pat. No. 3,551,015 issued Dec. 29, 1970 which application was a continuation of application Ser. No. 709,654, filed Mar. 1, 1968 now abandoned.

The present invention relates, in general, to joints and, in particular, to a plurality of members secured together by a rivet.

In many applications where fasteners are used to join a panel or other member to a support, e.g., when attaching a vehicle skin to its frame, several design requirements are imposed on both the fastener and the joint. Among the requirements of the fastener are that it provide a seal around and transfer loads across the aperture in which it is installed, and that it provide good resistance to diverse environmental conditions. In certain applications the fastener is also required to be flush with the panel when installed. Among the requirements of the joint are that it have a relatively high fatigue strength and a relatively light weight. In addition, the joint should be economical and easy to assembly.

One type of fastener commonly used in these applications is rivets; however, the prior art rivets do not concurrently satisfy all of the requirements listed above, nor does the resulting joint. For example, in order to seal the aperture, an additional and expensive sealing mechanism is required. In addition, load transfer across the hole is relatively poor because the rivet heads generally rely on frictional resistance to carry the load and prevent deformation of the hole. In those applications where the fastener must lie flush with the panel when installed, the panel has to be countersunk to receive the rivet head. Because of the countersink arrangement, the panel must be thicker, adding to the material costs of the joint, and the formation of the countersink adds to the labor costs of the joint. Moreover, because of the additional thickness required, the weight of the assembly is increased, but since material is removed when countersinking the panel, the joint is weakened.

While the rivet and collar combination claimed in copending application Ser. No. 859,533, now U.S. Pat. No. 3,551,015, meets all of the requirements set forth above, it is primarily an extremely high fatigue strength system that finds ideal use in attaching the skin of an aircraft to its associated frame. In other uses, e.g., when attaching the skin of a bus to its associated frame, the fatigue strength required is lower than that provided by the rivet and collar combination and, accordingly, use of the rivet and collar combination in a bus becomes slightly uneconomical due to the added cost of the collar.

It is an object of this invention, therefore, to provide an economical joint wherein the fastener is self-sealing in its associated aperture, transfers loads across the aperture, provides good resistance to environmental conditions and provides a high fatigue strength characteristic with respect to the panel.

It is a further object of this invention to provide a joint wherein the fastener can lie flush with the panel without adding weight to or reducing the strength of the structural members.

Briefly, a joint according to the invention claimed herein comprises a rivet having a coining ring formed on the underside of the head and a groove formed in the shank adjacent the head. The rivet is inserted in aligned apertures in an associated panel and a support member, so that the tail of the rivet projects beyond the aperture. When struck by a suitable punch device, the head becomes embedded in the panel and causes a cold flow of panel material into the groove in the shank. The tail of the rivet is then upset to form a flare that clamps the panel and support member together.

Because of the conformity between the panel and the rivet head caused by the cold flow of panel material, the aperture is sealed and the rivet is capable of transferring loads across the hole. The flow of panel material also provides a residual compressive stress in the panel and when the tail is upset, the shank of the rivet expands radially providing an interference fit in the aperture and superimposing residual tensile stresses on the residual compressive stresses in the panel. Thus, the joint has a relatively high fatigue strength. In addition, if the head is completely embedded in the panel, the rivet lies flush therewith and the undesirable countersink arrangement is obviated.

For a better understanding of the present invention, together with other and further objects thereof, reference is made to the following description, taken in connection with the accompanying drawings, and its scope will be pointed out in the appended claims.

Referring to the drawings:

FIGS. 3a, 3b, 3c and 3d illustrate the sequence in which a rivet constructed in accordance with the present invention is installed to secure two members together.

Figure 1:
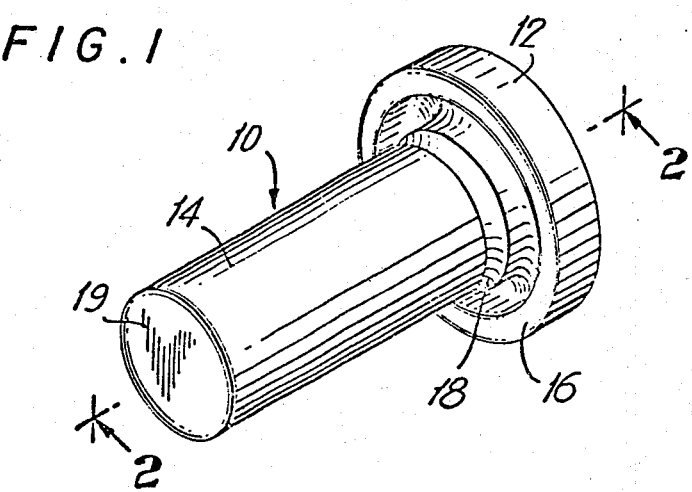
FIG. 1 is a perspective view of a rivet constructed in accordance with the present invention.
Figure 2:
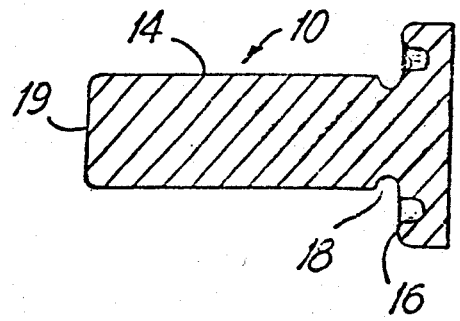
FIG. 2 is a sectional view taken along line 2—2 of FIG. 1.

Referring to FIGS. 1 and 2, which illustrate a rivet constructed in accordance with the present invention, the rivet 10 has a head 12 and a shank 14. A peripheral ridge or coining ring 16 is provided on the underside of rivet head 12. As most clearly shown in FIG. 2, for the embodiment illustrated, the cross-section of coining ring 16 is semi-circular. An annular groove 18 is provided in rivet shank 14 in the vicinity of rivet head 12.

FIGS. 3a, 3b, 3c and 3d are vertical sections showing the sequence of securing two structural members 40 and 42 together with a rivet in accordance with the present invention. Member 40 is made of a material capable of being extruded. In FIG. 3a, rivet 10 is shown above member 40. Members 40 and 42 are provided with holes 44 and 46, respectively, to receive shank 14 of rivet 10. With members 40 and 42 positioned adjacent one another and holes 44 and 46 aligned, there is provided a single passage extending completely through the members from the outside surface 48 of member 40 to the outside surface 50 of member 42.

The rivet is installed by passing shank 14 through holes 44 and 46 so that the underside of head 12 is positioned against outside surface 48 of panel 40 and the tail 19 projects from outside surface 50 of panel 42. This is illustrated in FIG. 3b.

Next, rivet head 12 is driven into panel 40 at outside surface 48 to embed the head in this panel. This is illustrated in FIG. 3c. The driving of rivet head 12 may be accomplished by a suitable punch 60, represented by dashed lines, which when driven downward forces the head of the rivet into panel 40. A suitable die member 62, also represented by dashed lines, is positioned beneath panel 42 to support the two panels as the rivet head is embedded in the upper panel.

As rivet head 12 is driven into panel 40, material of this panel lying beneath the rivet head is displaced by cold flow. Some of the displaced material of panel 40 flows into annular groove 18 in shank 14 of the rivet to clinch the rivet in panel 40. Some more of this displaced material flows to take up clearance provided between the surface of hole 44 in panel 40 and rivet shank 14. The volume of the head embedded in panel 40 preferably is selected to be greater than the sum of the volume of groove 18 plus the volume of the clearance between shank 14 and panel 40. As a result, the excess in volume of the embedded head causes panel 40 to be packed in the vicinity of hole 44, thereby reducing the size of the hole. A reduction in hole size creates a residual compressive stress in the panel around the hole. Coining ring 16 on the underside of rivet head 12 is shaped and dimensioned to control the cold flow of the panel material to effect the desired reduction in hole size and, accordingly, the desired residual compressive stress. In addition, with coining ring 16 embedded in panel 40, hole 44 in this panel is bridged by rivet head 12 so that axial loads in panel 40 are coupled effectively across hole 44 by the rivet head and a seal is formed across the hole.

After head 12 is embedded in panel 40, the tail 19 of rivet shank 14 is upset. This is illustrated in FIGS. 3c and 3d. The upsetting of the tail of shank 14 may be accomplished by a suitable punch 66, represented by dashed lines, which when driven upward causes the shank to expand radially against the surfaces of holes 44 and 46 and the tail to flare. The radial expansion of the shank creates an interference fit between the rivet shank and panels 40 and 42 and causes material of panels 40 and 42 in the vicinity of the holes to move outwardly, thereby developing residual tensile stresses in panels 40 and 42. It should be noted that the tensile stresses developed in panel 40 are superimposed on the compressive stresses developed by coining ring 16. The extent of the radial expansion of shank 14 determines whether the deformation of panels 40 and 42 is elastic or plastic. Generally, the type of deformation selected is dependent upon the choice of panel material and its resistance to stress corrosion.

The flaring of tail 19 of the rivet drives rivet material against surface 50 to clamp panels 40 and 42 together.

At this point it is worthwhile to consider some of the advantages of a rivet and joint in accordance with the present invention. The fatigue strength of the joint is increased over that of joints using conventional rivets because of a combination of factors including the reduction in stress amplitude caused by the tensile stress developed in both panels. Adding to the increased fatigue strength of the panel in which the coining ring is embedded is the reduction in the maximum stress induced by external loads on the joint, which reduction is caused by the compressive stress developed in that panel. Also, since the head of the rivet is embedded in one of the panels, loads are transmitted across the hole in that panel and, thus, fatigue strength in that panel is increased. In addition, by eliminating the need for countersunk holes and embedding the head of the rivet, added resistance to stress corrosion in the head area is provided by the present invention in comparison to fasteners seated in countersunk holes. This is due to the conformity of the panel material to the rivet head as the head is embedded in the panel. In the case of countersunk fasteners, because of manufacturing tolerances there is the likelihood of a mismatch between the underside of the head of the fastener and the countersunk hole which increases the susceptibility of the panel to stress corrosion.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A joint comprising:
a stack of structural members including a first member made of material capable of being extruded and having a first initially cylindrical preformed hole, the material of said first member surrounding said first hole conditioned to have a residual tensile stress superimposed upon a residual compressive stress and a second preformed member having a second hole aligned with said first hole,
and a rivet including a head completely embedded within said first member with said head being flush with an outside surface thereof, said rivet further including a shank extending from said head having a solid cross-section tightly fitted within said first and second holes and terminating in a flared tail bearing against an outside surface of said second member, said shank having a recessed portion formed therein adjacent said head, said head having axially projecting means on the underside thereof including a convexly arcuate surface on the extremity thereof remote from said head causing a controlled cold flow of said material to said first member during embedment of said head therein, said cold flow material extending into said recessed portion and causing compressive stresses around said first hole.

2. A joint according to claim 1 wherein the volume of said rivet head embedded in said first member is greater than the sum of the volume of said recessed portion of said rivet shank plus the volume of the clearance between said rivet shank and said first member before said rivet head is embedded in said first member.

3. A fastening unit according to claim 1 wherein said recessed portion of said rivet shank is an annular groove located between said rivet head and the midpoint of said rivet shank.

4. A fastening unit according to claim 1 wherein said axially projecting means of said rivet comprises a semicircular ridge on the underside of said rivet head and integral with said rivet head.

5. A fastening unit according to claim 4 wherein said ridge is located at the periphery of said underside of said rivet head.

* * * * *